United States Patent [19]

Kuchta et al.

[11] Patent Number: 5,264,067
[45] Date of Patent: Nov. 23, 1993

[54] ADJUSTABLE LENGTH CARRIAGE COMPATIBLE FOR USE WITH DIFFERING SPREADING TABLE WIDTHS AND TYPES

[75] Inventors: Richard Kuchta, Tolland; Donald C. Button, Cheshire; Joseph R. Vivirito, South Windsor, all of Conn.; Philip W. Cenedella, East Douglas, Mass.

[73] Assignee: Geber Garment Technology, Inc., Tolland, Conn.

[21] Appl. No.: 872,605

[22] Filed: Apr. 23, 1992

[51] Int. Cl.⁵ .................................. B32B 31/00
[52] U.S. Cl. .................. 156/361; 29/426.3; 29/563; 83/174; 83/468; 156/510; 156/515; 156/517; 212/205
[58] Field of Search ............... 156/250, 361, 363, 510, 156/515, 517, 556; 29/563, 426.3; 83/174, 468; 212/205, 213; 414/460

[56] References Cited

U.S. PATENT DOCUMENTS

| | | | |
|---|---|---|---|
| 3,970,831 | 7/1976 | Hegyi | 156/363 |
| 3,973,679 | 8/1976 | Huss et al. | 212/205 |
| 4,573,856 | 3/1986 | Meyer et al. | 212/213 |
| 4,841,822 | 6/1989 | Gerber | 83/174 |
| 5,018,562 | 5/1991 | Adams | 83/468 |
| 5,088,181 | 2/1992 | Jeppsson | 29/563 |
| 5,136,909 | 8/1992 | Mellick | 83/468 |

FOREIGN PATENT DOCUMENTS

| | | | |
|---|---|---|---|
| 1184277 | 3/1985 | Canada | 212/205 |
| 996191 | 6/1965 | United Kingdom | 212/205 |

Primary Examiner—David A. Simmons
Assistant Examiner—W. J. Matney, Jr.
Attorney, Agent, or Firm—McCormick, Paulding & Huber

[57] ABSTRACT

A tool carriage includes a main beam along which a subcarriage carrying the tool travels and is supported above a supporting table by two end parts each associated with opposite ends of the main beam. The main beam has a length sufficient to straddle the widest width of conventional supporting tables and is adjustable at one of the two end parts to accommodate different table widths. The end parts have rollers which support the carriage above the table support surface and against lateral displacement on the table. The lateral rollers on one end of the carriage are capable of being adjusted relative to horizontal and vertically extending directions allowing either end of the carriage to be generically adaptable to any table edge configuration.

18 Claims, 9 Drawing Sheets

ADJUSTABLE LENGTH CARRIAGE COMPATIBLE FOR USE WITH DIFFERING SPREADING TABLE WIDTHS AND TYPES

CROSS REFERENCE TO RELATED APPLICATIONS

This invention relates to co-pending U.S. patent application Ser. No. 07/639,789 entitled TOOL CARRIAGE AND LIFTING AND SUPPORT CART THEREFORE, filed in the name of H. Joseph Gerber on Jan. 10, 1991, being commonly assigned with the assignee of the present invention.

BACKGROUND OF THE INVENTION

This invention relates to the cutting of pattern pieces from fabric or similar sheet material spread either as a single ply or as a multilayered layup on a supporting surface, and deals more particularly with an improvement in a tool carriage, such as used for holding a labeller, wherein the carriage is adapted to be mounted on any one of a number of different supporting tables into and out of working relationship with the table regardless of width variances and mounting track differences which might exist between tables assembled in a cutting room.

A work tool carriage, such as disclosed in aforementioned U.S. patent application Ser. No. 07/639,789, is adapted to be readily connected to various tables in a cutting room environment by virtue of its compactness and transportability. Providing a carriage with such features is highly advantageous since a single carriage can be used to service several other layup support tables. However, the carriage which is disclosed in the aforementioned co-pending U.S. application, while being readily adaptable to be fitted onto tables in succession, it is nevertheless restricted in its use to table types having a given guide configuration and similar width dimensions. That is, as disclosed in the aforesaid application, each side of the carriage utilizes rollers which track along the edge of the table to constrain the movement of the carriage in a lateral sense. These rollers are hydraulically controlled such that they move into and out of engagement with the side edges of the table. Any lateral play provided in the lateral rollers exists for the purpose of allowing the carriage to be readily unseated from the table and subsequently locked into place on another. Thus, where there are width differences between tables which may exist in a cutting room, for example on the order of between 2-8 inches, carriages hitherto provided would not be adaptable to be used on these other different tables. In addition to table width variations, the side edge configurations of each table which commonly use a track for guiding the carriage often differ from table to table. Thus, one machine's wheel configuration may not be readily adaptable to be used in the tracks presented by a table of another. Also, in cutting rooms, the layout of the room itself may not make it possible to orient each carriage side along respective track edges associated with each carriage side. That is, orienting the drive side of the carriage with a drive track and the nondrive side of the carriage with a nondrive track of the table may not be possible. Thus, it becomes important to have a carriage which is capable of being operated on a spread table in either 180 degree orientation.

Accordingly, it is an object of the present invention to provide a carriage which is capable of being readily mounted to a support table for travel along longitudinal edges thereof wherein the carriage can be readily made to adjust to any width variance that may be inherent between the involved tables as well as being capable of adapting to any track configuration that is particular to a given table.

It is a further object of the present invention to provide a carriage having means which allows the transverse beam to be quickly connected and disconnected by the operator to effect the aforementioned adaptability feature.

It is still a further object of the present invention to provide a carriage capable of being lifted and readily transported between such support tables for use in successive operations.

Further objects and advantages of the invention will become apparent from the foregoing specification and appended claims.

SUMMARY OF THE INVENTION

A carriage adaptable to be mounted for travel along one of any number of support tables each having a support surface and having varying widths and structures for supporting the carriage for movement in a first coordinate direction, comprises an elongate main beam having a first end and an opposite second end the distance between each of the first and second ends defining a beam length being sufficient to straddle a table of maximum width. A first support end part is associated with one end of the beam for supporting the main beam above the supporting surface of the table, the first support end part having first bearing means for supporting the main beam above the support surface and having a second bearing means supporting the beam against lateral movement in a second coordinate direction orthogonally disposed in relation to the first coordinate direction. A second support end part is associated with the second end of the main beam for supporting the second end of the main beam with the first end part above the support surface of the table, the second support end part having a third bearing means for supporting the beam for movement in the first coordinate direction and having a fourth bearing means for supporting the main beam at the second end against lateral movement while travelling on the table. Drive means is provided for moving the carriage along the first coordinate direction. The carriage further includes adjustment means for aligning the fourth means relative to the second coordinate direction and to a third coordinate direction extending perpendicularly to the first and the second coordinate direction and one of the first and the second support end parts is adjustably connected to the main beam at one of the first and second ends thereof to allow for the effective length of the main beam to be varied to permit the carriage to fit across tables of varying width.

DETAILED DESCRIPTION OF THE PREFERRED EMBODIMENT

Figure 1:
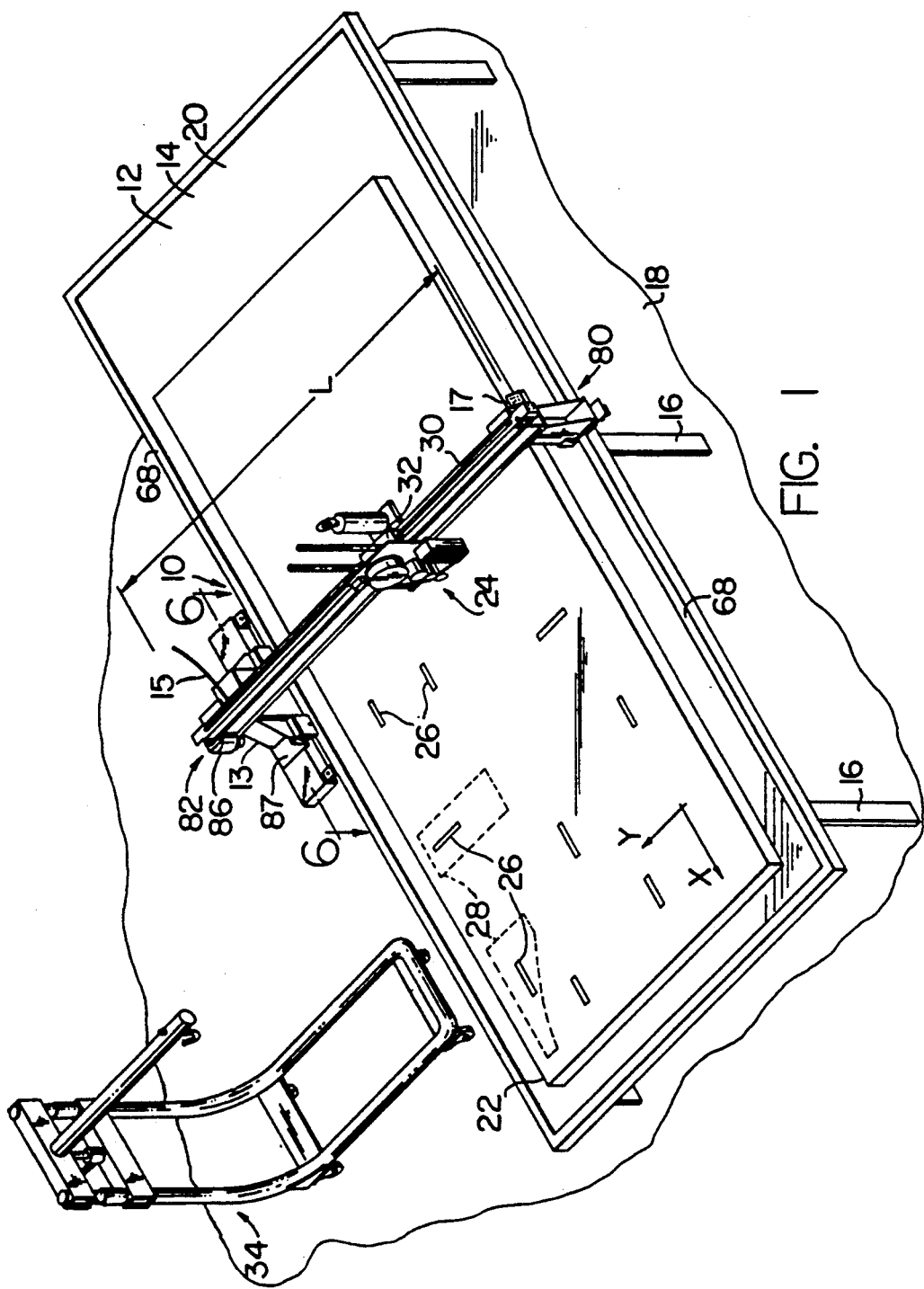
FIG. 1 is a schematic perspective view showing a tool carriage embodying the invention in working relationship with a work material supporting table and also showing an associated lifting and transport cart for the carriage.
Figure 2A:
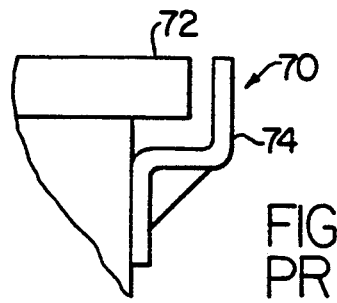
FIGS. 2a–d illustrate conventional guides that are used in association with the supporting table of FIG. 1.
Figure 2B:
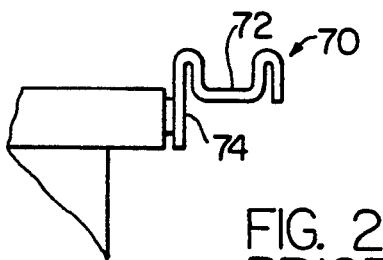
Figure 2C:
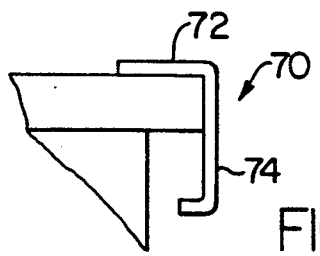
Figure 2D:
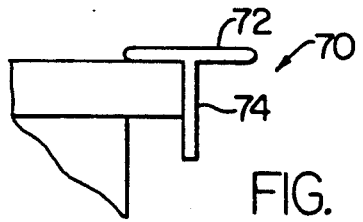

Turning first to FIG. 1, a carriage 10 embodying the invention is therein shown in working relationship with a table 12 having a top 14 supported by legs 16,16 above a floor 18. The top 14 of the table provides an upwardly facing supporting surface 20 for supporting sheet material to be worked on. The sheet material may consist of a single layer or as shown in the FIG. 1 may be a layup 22 of superimposed sheets of fabric or other sheet material. The table 12 may be one designed and intended to hold the layup of sheet material during the performance of various different work procedures. For example, the table may be a spreading table for holding the material while it is being spread in preparation for cutting later, a cutting table for holding the material while being cut, or even a take-away table for holding the material subsequent to its cutting and for removing the pattern pieces from the waste material. In the illustrated instance however, the table 12 is shown as a spreading table.

A feature of the invention is that the carriage 10 is moveable vertically relative to the table into and out of its working relationship so that it can be used to service other tables. To perform this lifting and transport function, the carriage has associated with it a lifting transport cart 34. Thus, in a single spreading room, a number of spreading tables may be serviced by a single carriage by using the transport cart to move from table to table.

In FIG. 1, the carriage 10 is illustrated as used to support a labeller 24 for applying labels 26 to the top surface of the layup 22 to identify pattern pieces later to be cut from the layup, two such pattern pieces being shown in broken lines in FIG. 1 at 28. The labeller may take various different forms, but in the preferred embodiment it is one such as disclosed in co-pending U.S. patent application Ser. No. 07/585,177 to which reference may be made for further details of its construction and which application being hereby incorporated by reference. The labeller 24 is capable of placing labels 26 at predetermined positions on the top surface of the layup. For this purpose, the carriage 10 includes a main beam 30 having a length L sufficient to straddle a table of maximum width above the layup 22. The carriage 10 is moveable longitudinally of the table in the illustrated X coordinate direction and carries a subcarriage 32 movable along its length in the illustrated Y coordinate direction, and carrying the labeller 24. At one end of the main beam 30 is disposed a housing 13 carrying various components making the carriage 10 completely self-contained except for being supplied by power by the line 15. These components may for example include an electrical power converter for the power supplied by the line 15 to transform it into voltages which are usable by other component parts of the carriage, a control system for controlling the labeller and positioning motors responsible for driving the carriage along the indicated X-coordinate direction and for driving the subcarriage 32 in the indicated Y-coordinate direction. The control system is a stand-alone type, which uses position information to drive the position motors in the carriage in response to the position information gathered by the carriage while initializing and information associated with the labels used by the labeller. The control system includes a control console 17 carried by the carriage at the end of the beam 30 opposite the housing 13. The housing further includes a means providing pressurized air comprising an air actuated pump, a drive motor for the pump, and an associated pressure tank for use by air actuated components. Therefore, by the combined coordinated movements of the main beam 30 in the X coordinate direction and the movement of the subcarriage 32 in the Y coordinate direction the labeller may be moved to any position on the top surface of the layup to apply a label at that point.

As is shown in FIGS. 2a-d, each table with which the carriage 10 may be used, may have a guide track of the type shown therein extending along one or in some cases along both of its lateral side edges, or may even be void of such tracks such that the carriage rides along the corner edges of the table. The carriage 10 in accordance with the invention is particularly well adapted to engage with one or both of tracks or along the side edges of the table in a manner that will hereinafter become apparent. That is, the table top 14 has two marginal edge portions 68,68 extending respectively along its two lateral sides, each of which portions may include one or two longitudinally extending extrusions 70 of the type shown in FIGS. 2a-2d which provide wholly or in part upwardly and laterally outwardly disposed faces defined respectively by a horizontal top surface 72 and an outward side surface 74. As mentioned, each extrusion may take a variety of forms including forms shown in FIGS. 2a-2d, and the carriage 10 is adaptable to engage on the extrusion or on the table edge, in whichever case may be presented by the particular table type.

Figure 3:
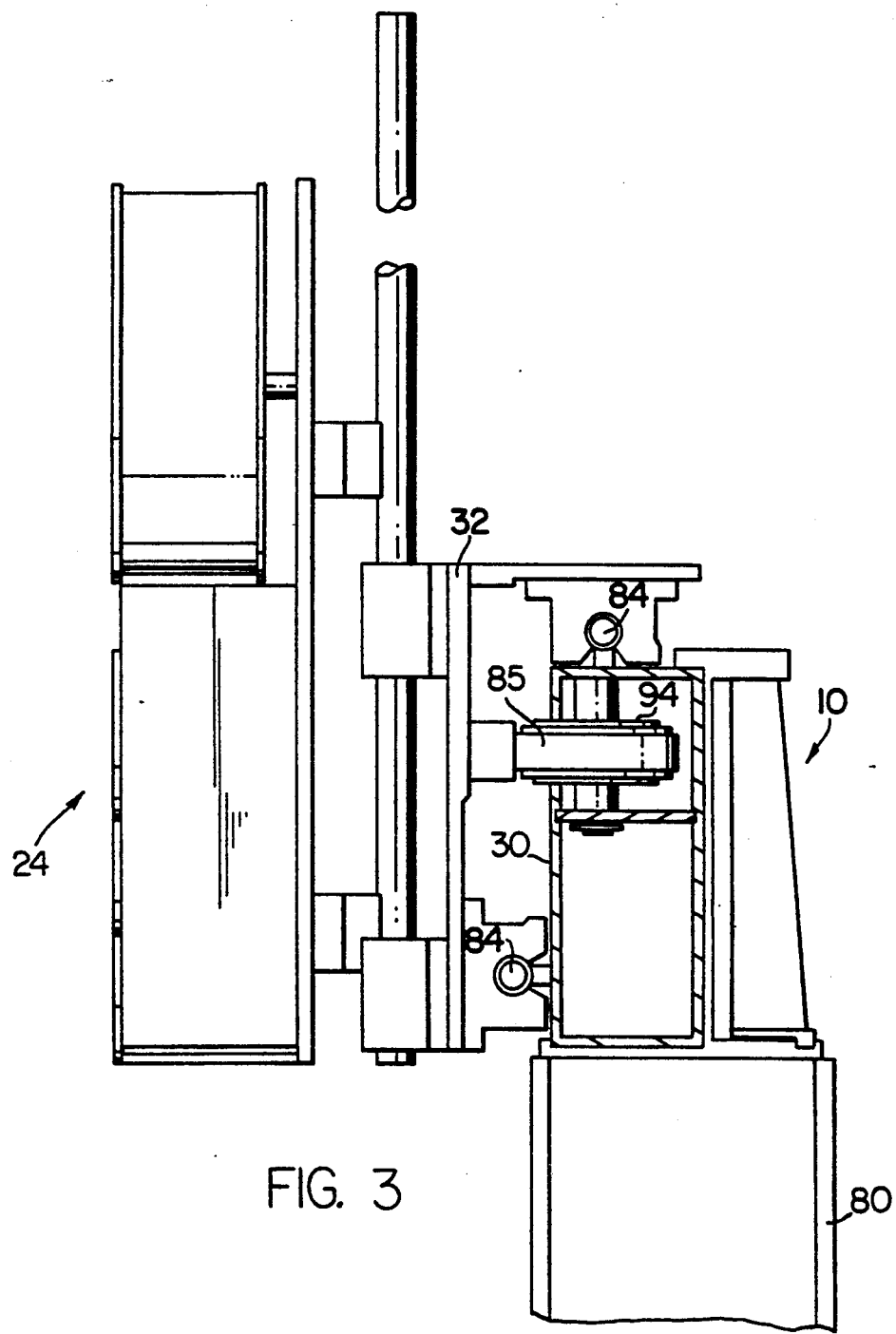
FIG. 3 is a partially fragmentary vertical sectional view taken through the carriage beam showing the labeller and way structure of the machine.

The main beam 30 of the work carriage as shown in FIG. 3 carries two horizontal parallel guide ways 84,84 supporting the subcarriage 32 for movement along the effective length of the beam with such movement being effected by a drive and positioning electric motor carried by the beam 30. A belt 88 is fixed to the subcarriage and is trained over pulleys 92,92 located at opposite ends of the main beam 30 one of which is driven by the motor 86, with each pulley being disposed at opposite ends of the beam 30.

Figure 4:
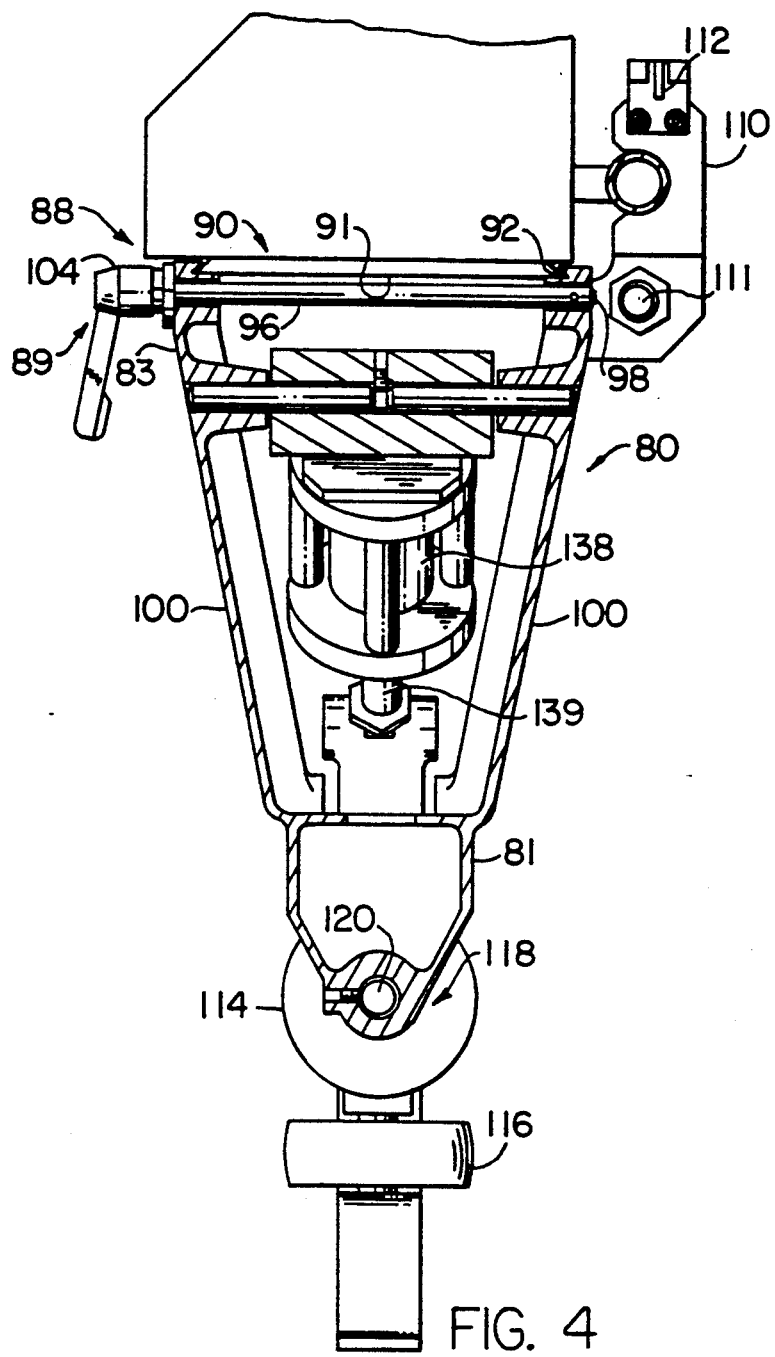
FIG. 4 is a vertical sectional view taken through the carriage separated from the table showing the beam schematically and revealing the adjustable connection between it and the first end part.
Figure 5:
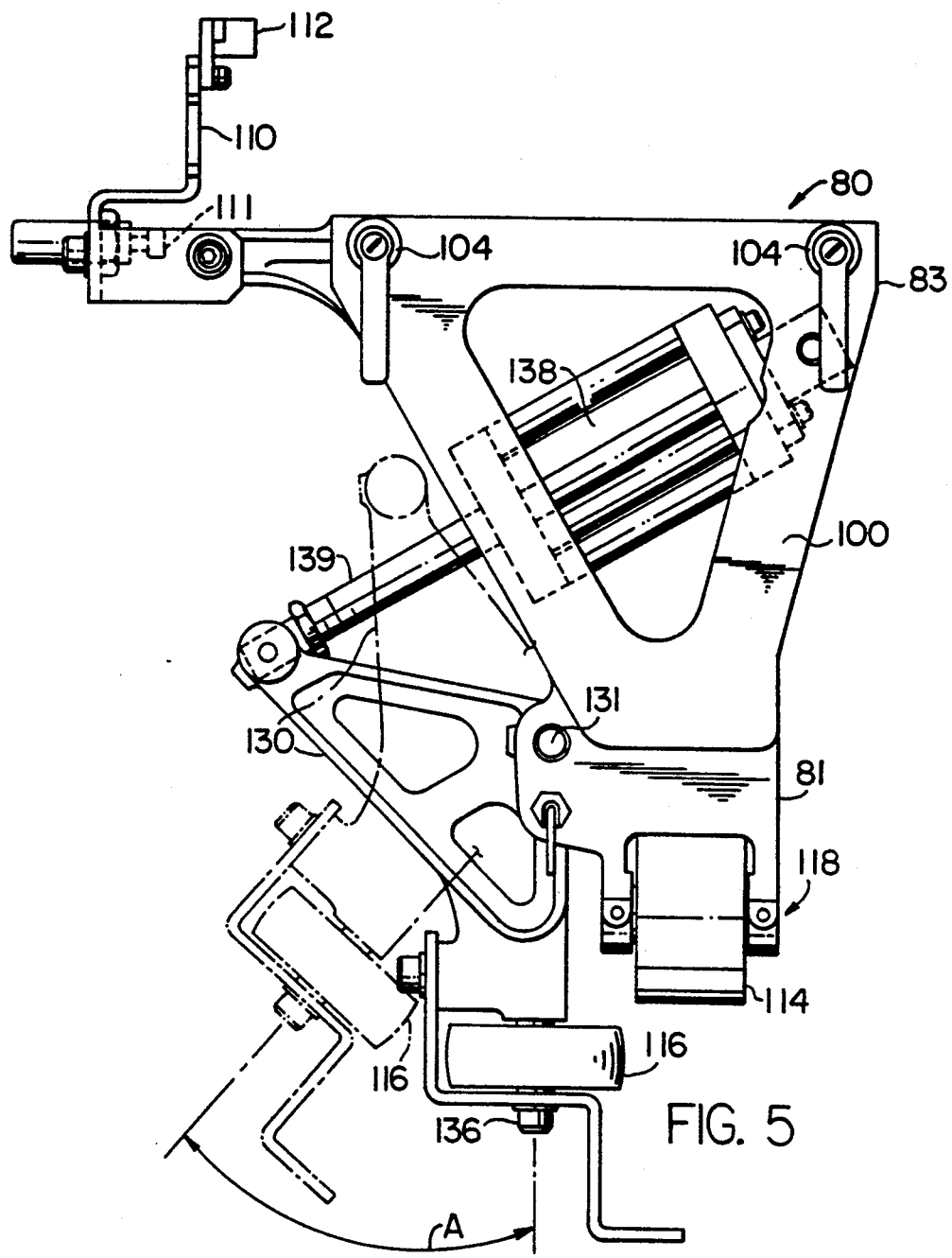
FIG. 5 is a front elevation view of the first end part of FIG. 4 showing in phantom line the articulated movement of the lateral centering roller.
Figure 6:
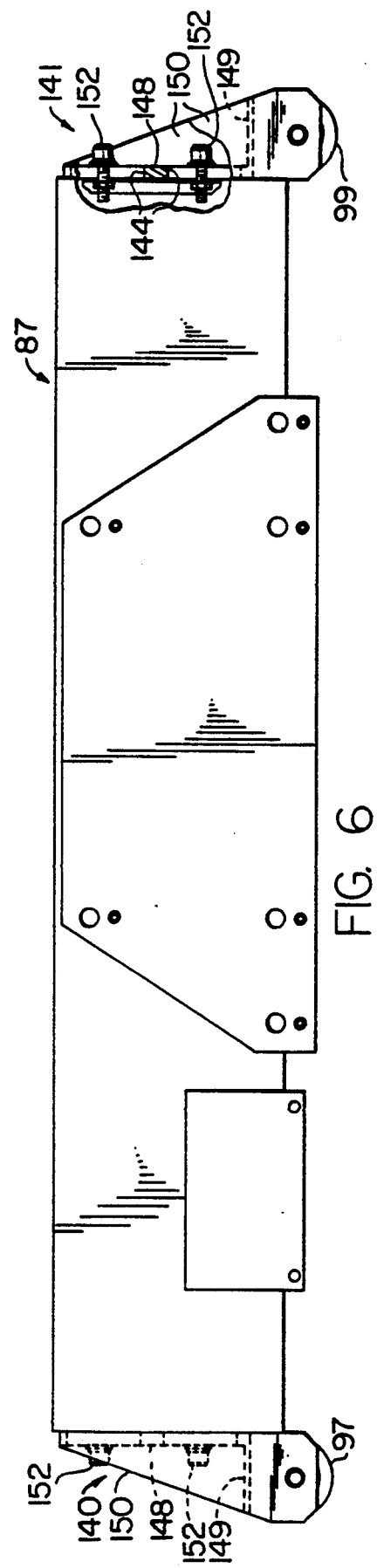
FIG. 6 is a horizontal sectional view through the carriage shown in FIG. 1 along line 6—6.
Figure 7:
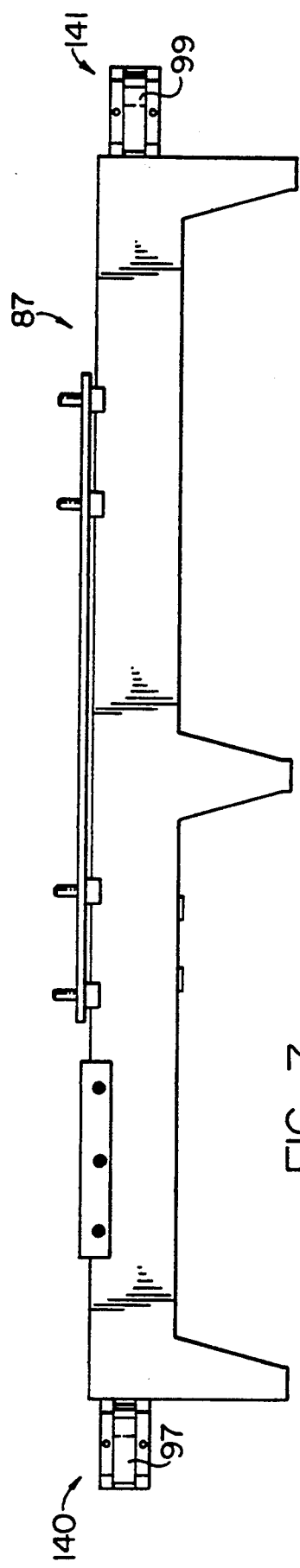
FIG. 7 is a side elevation view of the drive mount of FIG. 6.

The main beam 30 is supported for movement above the table top 14 by first and second end parts 80 and 82 which respectively are provided with associated roller bearing means for travelling on a respective one of the marginal edge portions 68,68 of the table. Taking the first end part 80 first, it should be seen from FIGS. 4 and 5 that the first support end part 80 has a generally V-shaped construction as defined by two opposed side walls 100,100 preferably formed from aluminum, providing a wider top portion 83 associated with the beam 30 and a narrower base portion 81 associated with the support table. The first end part 80 carries first and second roller bearings 114 and 116 each adapted to respectively hold the main beam in a desired vertical and lateral disposition. For this purpose, the base portion 81 of the end part 80 includes a journalling means 118 for receiving an axle 120 about which the roller 114 is rotatably mounted. Located adjacent the base 81 of the end part 80 is a triangular frame member 130 one corner of which is pivotally connected at 131 to the first end part 80 at the base 81. The second corner of the triangular frame carries the lateral centering roller 116 which is mounted for rotation on a shaft 136 extending outwardly from and fixed to the frame 130. The roller 116 is thus capable of swinging through an arc A which is coincident with a plane that includes the Y coordinate axis or other lines of direction extending parallel to it. For moving the roller 116 through this plane, a pneumatic actuator 138 is provided and is secured to the first end part 80 intermediate the base 81 and the top end 83 and has a sliding rod 139 connected to the remaining corner of the triangular frame 138 thereby causing the frame 138 to be rotated through the arc A to draw the roller into engagement with the marginal side track of the table 14. The actuator 138 is energized by the air pressure means provided in the housing 17 upon the controlled release of such air pressure. It being noted that the angular displaceability of the roller 116 relative to the table edge permits seating of the roller 116 on either side edge of the table irrespective of whether the involved edge is a simple right angular edge or one having the configuration of the side tracks shown in FIGS. 2a-d above.

The first end part 80 is selectively lockable at its top end 83 to the beam 30 through the intermediary of a means 88 associated with each of the beam 30 and the end part 80. This means includes a locking means 89 and a sliding joint means 90 cooperating with the joint means to permit locking of the beam 30 at discrete points along its length. The joint means 90 includes an elongate dovetail projection 91 fixed to the bottom of the beam 30 and directed parallel to the elongate extent of the beam 30 parallel to the Y-coordinate direction. The top 83 of the first end part 80 includes a receiving groove having a correspondingly sized and shaped dovetail recesses for receiving in sliding engagement therewith the projection 91 formed beneath the beam 30. The dovetailed parts slide relative to one another when the locking means is released with a clearance of approximately 6-10 thousandths of an inch. The projection 91 extends along the bottom of the beam 30 a length equalling about 15 inches thereby providing an adjustment capability equal to that amount.

The general V-shape of the first end part 80 aids in the locking feature between the beam and that part. That is, the locking means 89 includes an elongate member 96 fixed at one end 98 by a transversely extending pin in one of the opposed side walls 100,100 while being slidably journalled in the opposite side wall 100 of the part 80. The opposite end of the elongate member is threaded and cooperates with a nut 104 which takes up on the threaded end causing the groove to clamp the dovetail projection in an interference fit. This gripping action is caused by certain flexure in the V-shape of the end part 8 taken relative to the base portion 81 located remotely from this biting action.

The first support end part 80 also carries a mounting bracket 110 for holding a sensor 112 which is linked to the control system of the carriage and indicates to the controller that the subcarriage is about to come to the end of its travel. This is an important feature in that it allows the selected width adjustments in beam size to be automatically accounted for by indicating to the controller the end position of the travel run regardless of variations in the width of the table size. That is, the controller will initially cause the subcarriage 32 to travel the length of the beam in the indicated Y-coordinate direction from an origin that remains fixed on the beam 30 to determine the width of the table involved and to use this value in laying out the relative distances between labels. Thus, regardless of the carriage width actually used, the width of the table will always automatically be determined by this initialization process. It is noted that the sensor 112 does not in fact stop motion since the inertial forces of the subcarriage 32 are sufficient to carry it beyond the sensor. Therefore, a linear decelerator or bumper 111 is employed and is fixed to the mounting bracket to deadened the forces at this end. Similarly, the home position of the carriage which is at the opposite end of the main beam 30 includes a second bumper which effects similar linear dampening of carriage as it travels in the opposite direction.

Referring now to FIGS. 6-9, and in particular to the second support end part 82 of the carriage 10, it should be seen that a drive mount 87 is provided at the base of the second end part 82 and is immovably connected to the beam 30 by the housing 13. The drive mount 87 includes two drive rollers 93,93 which engage the top surface of the table or track to drive the carriage in the X coordinate direction and are powered by a carriage drive motor 95 secured to the drive mount 87 and shown schematically in FIG. 8. The drive rollers 93,93 therefore support the beam 30 of the carriage 10 above the support surface of the table in a parallel relationship with it while simultaneously providing a drive for effecting movement of the carriage along the X coordinate direction.

Figure 8:
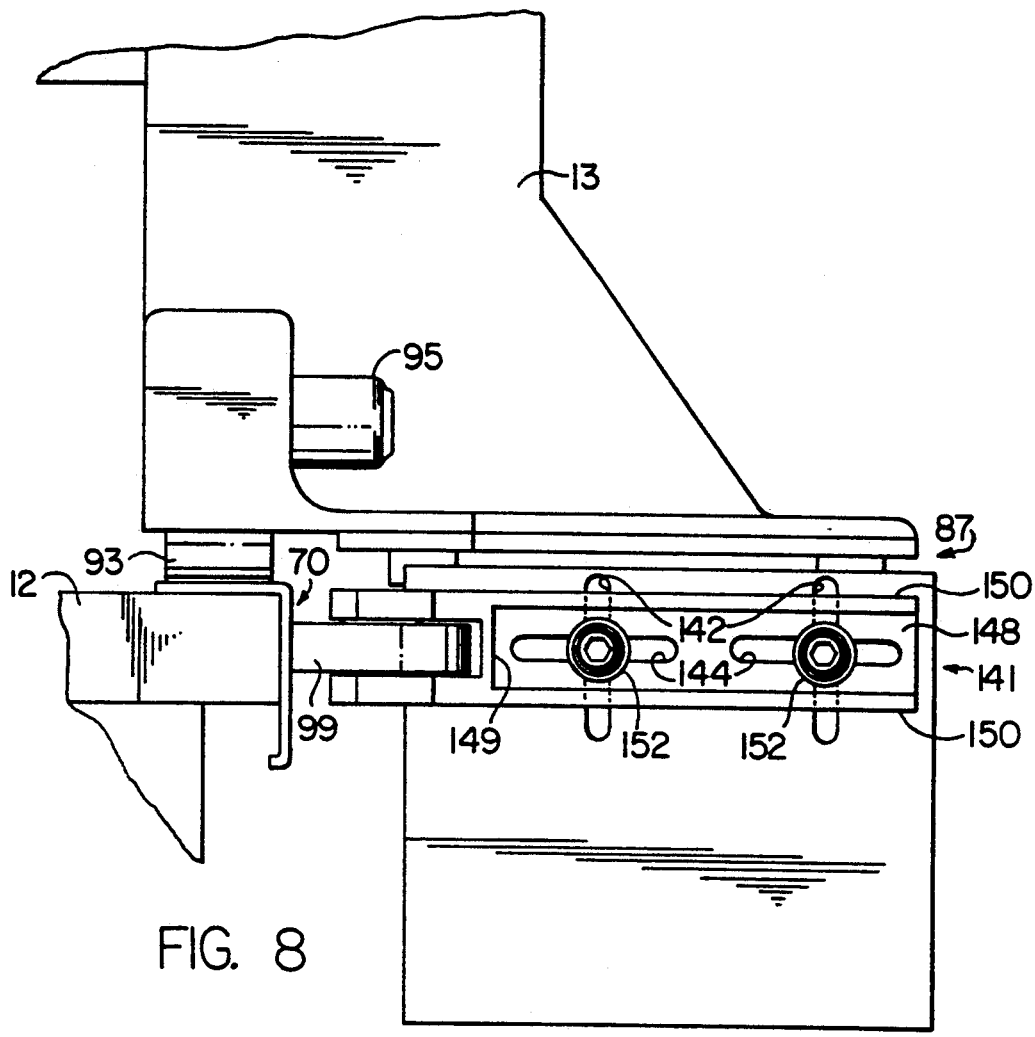
FIG. 8 is a partially fragmentary front elevation view showing the drive mount associated with the table edge.
Figure 9:
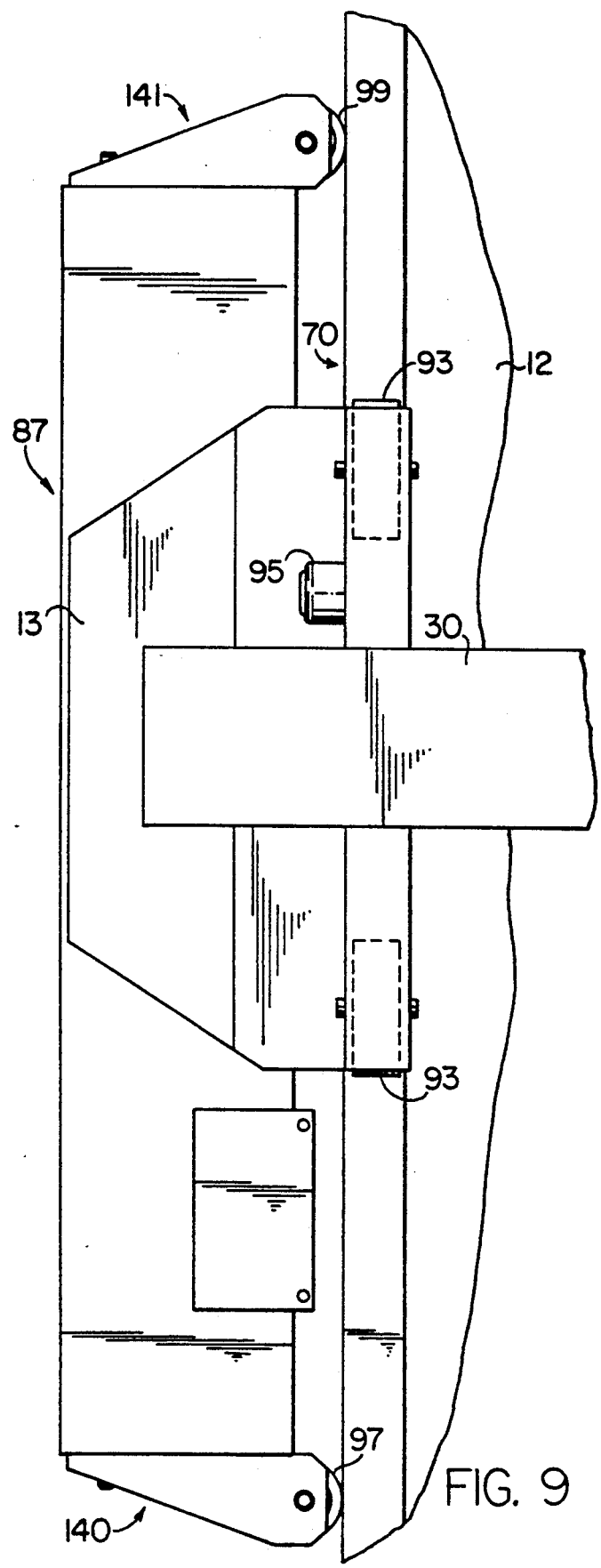
FIG. 9 is a partially fragmentary plan view showing the drive mount attached to the table edge of FIG. 8.

Disposed at each end of the drive mount 87 as taken along the X coordinate direction is an adjustable plate 140, 141 each rotatably mounting a transverse roller 97,99 for engagement along the lateral side edge of the table or track. Each of the plates 140,141 is adjustable in the Y coordinate direction as well as in the Z coordinate direction by virtue of first and second pairs of slots 142,142 and 144,144. As best seen in FIG. 8., the first pair of slots 142,142 is formed in each end of the drive mount 87 and extend vertically or parallel to on another and to the Z coordinate direction. Each of the mounting plates has a base flange 148 in which are formed the second slots 144,144 and include an orthogonally directed support flange 149 interconnected by a reinforcing web portion 150. Received within each of the slots 142,142 formed in the drive mount ends and in each of the mounting plates 140,141 are securement means 152,152 which cause the end plates to be secured to the drive mount 87 in a desired orientation. This means can take any number of different forms, but in the preferred embodiment they are a nut and bolt securement means. Thus, with the capability of simultaneous adjustment of the mounting plates on the drive mount ends in each of the Y and Z coordinate directions, the mounting plates and their associated rollers 97,99 can be oriented in infinite combinations including ones that are off-axis from each of the Y and Z directions to accommodate any variation of track configuration, such as previously discussed with reference to FIGS. 2a-2d.

In sum, the carriage 10 of the present invention is provided with a means located at each its opposite ends for readily securing the carriage to a support table regardless of the type of mounting configuration provided on the table. That is, the first end part 80 is provided with the articulated lateral roller 114 which is capable of engaging, by virtue of its pressurized articulated movement, a vertically disposed side edge or one that is in off-axis alignment with the vertically extending Z axis. The lateral rollers associated with the drive mount part are adjustable along both a vertical Z axis and a horizontal Y axis which together allow for off-axis centering the lateral rollers 97,99 to accommodate conventional configurations that the marginal track edges of the support table might take. The first support end part 80 is capable of adjustment on the beam 30 in the Y coordinate direction to accommodate varying widths of the support table. The first end part also carries the end of travel indicator which senses the presence of the subcarriage 32 at this location to provide initialized width data to the control system.

By the foregoing, an improved tool carriage has been disclosed for use with a support table. However, numerous modifications and substitutions may be had without departing from the spirit of the invention. For example, the interconnection between the main beam 30 and the first support part is disclosed as being a dovetail type connection. However, it is well within the purview of the invention to employ other such types of slide locking connections which are capable of effecting the same selective locking between these parts. Also, the roller sizes, especially those of the laterally adjustable rollers 97 and 99, may be interchanged with others of differing sizes to further accommodate track width variations.

Accordingly, the invention has been described by way of illustration rather than limitation.

We claim:

1. A carriage adaptable to be mounted for travel along one of any number of support tables each having a support surface and having varying widths and structures for supporting said carriage for movement in a first coordinate direction, said carriage comprising:
   an elongate main beam having a first end and an opposite second end the distance between each of the first and second ends defining a beam length being sufficient to straddle a table of maximum width;
   a first support end part associated with one end of said beam for supporting said main beam above the supporting surface of said table;
   said first support end part having first bearing means for supporting said main beam above said support surface and having a second bearing means supporting said beam against lateral movement in a second coordinate direction orthogonally disposed in relation to the first coordinate direction;
   a second support end part associated with said second end of said main beam for supporting said second end of said main beam with said first end part above said support surface of said table;
   said second support end part having a third bearing means for supporting said beam for movement in said first coordinate direction and having a fourth bearing means for supporting said main beam at said second end against lateral movement while travelling on said table;
   drive means for moving said carriage along said first coordinate direction;
   adjustment means for aligning said fourth means relative to said second coordinate direction and to a third coordinate direction extending perpendicularly to said first and said second coordinate direction; and
   wherein one of said first and said second support end parts is adjustably connected to said main beam at one of said first and second ends thereof to allow the effective length of said main beam to be varied to permit said carriage to fit across tables of varying width.

2. A carriage as defined in claim 1 further characterized in that said first supporting end part is adjustably lockable relative to said main beam and said second end part contains said means for driving said carriage in said first coordinate direction.

3. A carriage as defined in claim 2 further characterized in that said second means includes a roller member which is pivotally mounted to said first supporting end part and is articulated by an actuator into engagement with a lateral side edge of said table.

4. A carriage as defined in claim 3 further characterized in that said first supporting end part has a generally V-shaped configuration with the base of said V-shape being oriented toward said support surface of the table and the wider end of said V-shape being directed towards said main beam; and
   said base of said V-shaped end part including means for journalling a roller disposed for rotation about an axis oriented along or parallel to said second coordinate direction and constituting said first means.

5. A carriage as defined in claim 4 further characterized in that said roller of said second means is capable of being articulated through an arc which includes a plane including or extending generally parallel to said second coordinate direction;
   said second means including a triangular frame member and said roller of said second means being supported on a triangular frame at one corner thereof; and
   said frame member being pivotally connected to said generally V-shaped first supporting end part at the base portion thereof and the remaining corner of said triangular shape being connected to the first supporting end part through the intermediary of an actuator.

6. A carriage as defined in claim 4 further characterized in that said first supporting end part includes a generally V-shaped structure supporting said carriage above the support surface of a table;
   said V-shape structure being oriented such that the wider portion thereof faces the underside of said beam and the base portion thereof faces the table support surface; and
   wherein said first end part connects to said main beam through the intermediary of a sliding dovetail joint disposed between the first supporting end part and the main beam of the carriage.

7. A carriage as defined in claim 6 further characterized in that the underside of the said main beam carries a dovetail projection having an elongate extent extending along a direction parallel to the second coordinate direction;
   said upper portion of said generally V-shaped structure includes a groove defined by opposed recesses so as to sliding receive said dovetail projection therein; and
   said first mounting part includes a locking means for locking the dovetail projection within the opposed recesses formed in the first mounting part.

8. A carriage as defined in claim 7 further characterized in that said locking means includes a clamp member capable of drawing the opposed recesses in the supporting first end part toward one another; and wherein the generally V-shaped configuration of said first supporting end part creates a slight flexure in the structure allowing said clamping means to squeeze and create an interference fit between the dovetail projection and the opposed recesses.

9. A carriage as defined in claim 2 further characterized in that said third means associated with said second end of said beam includes at least one drive roller and a drive mount interconnected with said second supporting end part by a housing; and said at least one drive roller being fixed in relationship to said beam second end and being driven by a drive motor carried in said drive mount.

10. A carriage as defined in claim 9 further characterized in that said fourth means for rotatably supporting said carriage second end against lateral movement in said second orthogonal direction includes first and second elongate mounting plates secured at each end to said drive mount; and said first and second mounting plates carrying a roller having a rotational axis extending perpendicularly to the longitudinal extent of each of said mounting brackets.

11. A carriage as defined in claim 10 further characterized in that each end of said drive mount has at least one elongate slot extending in one of said second and said third coordinate directions;

each of said mounting brackets includes at least one elongate slot extending in the other of said second and third coordinate directions; and wherein means are provided for clamping each of said first and second mounting brackets to the respective ends of said drive mount in a desired orientation relative to said second and third coordinate directions.

12. A carriage as defined in claim 11 further characterized in that said at least one slot formed at each end of said drive mount is a slot which extends generally vertically along said third coordinate direction;

each of said at least one slot formed in said first and second mounting brackets extends parallel to said second coordinate direction when said rollers associated with each mounting bracket are disposed for rotation about said third coordinate direction; and wherein said clamping means is an elongate shank having a retaining means at one end thereof and a threaded length at its other end which is engaged by a locking nut.

13. A carriage as defined in claim 12 further characterized in that each of said mounting plates has a base portion and a support portion extending generally orthogonally thereto;

said support portion providing means for journalling said roller associated with it for rotation about an axis extending orthogonally to the elongate extent of each of the mounting plates; and wherein said base portion and said support portion of each of said mounting plates being interconnected by web portions.

14. A carriage as defined in claim 2 further characterized in that said main beam contains means upon which a subcarriage travels along said second coordinate direction and carrying a tool;

said subcarriage being driven by a drive motor along said second coordinate axis between limits of travel on said main beam; and wherein said first support end part includes a sensor means for indicating the presence of said subcarriage at one end of said beam to cause a controller provided in the carriage to detect the effective length of said main beam.

15. A carriage as defined in claim 14 further characterized in that said tool carried by said tool carriage is a labeller for applying labels to the upwardly directed surface of a layup.

16. A carriage as defined in claim 10 further characterized in that said dovetail projection extends along the length of said main beam from the first end thereof a distance of about approximately 12-15 inches.

17. A carriage as defined in claim 12 further characterized in that said first supporting end part is formed from an aluminum material.

18. A carriage as defined in claim 17 further characterized by said rollers of said mounting brackets being interchangable with rollers having differing sizes.

* * * * *